United States Patent
Sonntag

(10) Patent No.: US 11,664,578 B2
(45) Date of Patent: May 30, 2023

(54) ARRANGEMENT FOR MONITORING TOOLS WHEN MACHINING ROTATIONALLY SYMMETRIC WORKPIECES

(71) Applicant: BRAEUER SYSTEMTECHNIK GMBH, Mildenau (DE)

(72) Inventor: Frank Sonntag, Thum (DE)

(73) Assignee: Braeuer Systemtechnik GmbH, Mildenau (DE)

( * ) Notice: Subject to any disclaimer, the term of this patent is extended or adjusted under 35 U.S.C. 154(b) by 0 days.

(21) Appl. No.: 17/048,402

(22) PCT Filed: Jul. 20, 2018

(86) PCT No.: PCT/EP2018/025199
§ 371 (c)(1),
(2) Date: Oct. 16, 2020

(87) PCT Pub. No.: WO2019/201414
PCT Pub. Date: Oct. 24, 2019

(65) Prior Publication Data
US 2021/0175603 A1    Jun. 10, 2021

(30) Foreign Application Priority Data

Apr. 17, 2018   (DE) .......................... 102018003123.4

(51) Int. Cl.
*H01Q 1/22*    (2006.01)
*H01Q 7/00*    (2006.01)
*B23K 10/00*   (2006.01)

(52) U.S. Cl.
CPC ......... *H01Q 1/2216* (2013.01); *B23K 10/006* (2013.01); *H01Q 7/00* (2013.01)

(58) Field of Classification Search
CPC ...... H01Q 1/2216; H01Q 7/00; H01Q 1/2225; H01Q 9/0414; B23K 10/006;
(Continued)

(56) References Cited

U.S. PATENT DOCUMENTS

2009/0096679 A1* 4/2009 Harokopus .......... H01Q 9/0414
                                                    343/700 MS
2009/0175694 A1* 7/2009 Craig ..................... B23B 51/00
                                                    700/173
(Continued)

FOREIGN PATENT DOCUMENTS

CN     203883119 U     10/2014
DE      20100102 U1     4/2001
(Continued)

*Primary Examiner* — Hai V Tran
*Assistant Examiner* — Michael M Bouizza
(74) *Attorney, Agent, or Firm* — Laurence A. Greenberg; Werner H. Stemer; Ralph E. Locher

(57) ABSTRACT

A multi-loop antenna and an RFID system are used for monitoring tools when machining rotationally symmetric workpieces. A multi-loop antenna is arranged on a tool carrier near a rotationally symmetric tool so that multi-loop antenna encloses the rotationally symmetric tool and the rotationally symmetric tool carries an RFID transponder. The position of this RFID transponder is arranged on the rotationally symmetric tool so that it is arranged in the electromagnetic ring field of the multi-loop antenna. The multi-loop antenna is arranged on the tool carrier so that it is possible to query the RFID transponder on the rotationally symmetric tool in any position while in motion and when at rest.

8 Claims, 2 Drawing Sheets

(58) Field of Classification Search
CPC ........ B23K 11/3063; G06K 7/00; B23C 9/00; B23Q 17/09
See application file for complete search history.

(56) References Cited

U.S. PATENT DOCUMENTS

| | | |
|---|---|---|
| 2009/0295659 A1 | 12/2009 | Blumberg, Jr. |
| 2015/0332071 A1 | 11/2015 | Hoffa et al. |
| 2018/0067003 A1* | 3/2018 | Michiwaki .............. G01L 5/243 |
| 2019/0299352 A1* | 10/2019 | Michiwaki .............. B23B 29/12 |

FOREIGN PATENT DOCUMENTS

| | | |
|---|---|---|
| DE | 19930485 C1 | 5/2001 |
| WO | 2009049191 A2 | 4/2009 |
| WO | 2009076496 A2 | 6/2009 |

* cited by examiner

ARRANGEMENT FOR MONITORING TOOLS WHEN MACHINING ROTATIONALLY SYMMETRIC WORKPIECES

BACKGROUND OF THE INVENTION

Field of the Invention

The invention relates to the use of a multi-loop antenna in fixtures for metalworking, especially for the machining of rotationally symmetric workpieces.

Such metalworking fixtures are used especially for the reworking of electrode caps in resistance welding technology, although its application is not limited thereto. The following statements focus primarily on this area of application.

Electrodes for the resistance welding technique that are used in robotic or manual tongs must be reworked to ensure the strength and reproducibility of welds depending on the wear on the caps. Due to the integration into automated processes, the time needed to perform this machining process must be kept short. It should reproduce the original shape of the cap for the most part and also ensure a long service life of the cap by minimizing material removal. For this purpose, it is known to use devices that contain a cutting insert in a driven milling cutter holder (DE 201 00 102 U1).

One effect of such devices is that material is removed with each machining step, which reduces the volume of the cap and limits its service life. In addition, the resulting chips must be reliably dissipated to the outside, so that a special structural design of the milling cutter and an additional device for deriving the chips are required.

DE 199 30 485 C1 describes a device for reforming welding electrode caps in which pairs of welding electrode caps are machined into shape with a welding gun using opposing work surfaces. In this case, the surface creating the shape consists of several surface segments arranged around the tool axis.

Devices are known for milling workpieces with surfaces of revolution, preferably of electrode caps for resistance welding, comprising of a pneumatically or electrically driven milling cutter holder, which comprises a releasably interconnected upper and lower part and in whose milling cutter holder there are two inserts (3, 4) mounted, one of which is designed as a flank cutter (4), the other as a face cutter (3), between which there are cutouts (5) arranged to remove the chips.

Solutions are also known according to which the device for machining rotationally symmetric metallic workpieces, in particular for the reworking of electrode caps with a pneumatically or electrically driven machining head with a cutting die mounted in a recess in the machining head in other embodiments, in addition equipped with at least one forming roller integrated into the machining head, wherein the contours of the cutting die, and in other embodiments also the work area of the forming rollers, correspond to the desired workpiece geometry.

Incorrect selection of the milling tool can be a problem with the use of such electrode cap milling cutters described above.

The final shape of the electrode cap is ultimately determined by the selection of the milling tool with a cutting die with defined contours.

When used in highly automated processes, which can be assumed when using welding robots and also automated cap cutters, incorrect selection of the milling tools must be prevented.

The disadvantage, though, is that manual selection of the milling tool can lead to an incorrect selection, and can thus lead to high follow-up costs.

The use of round antennas or multilayer antennas, referred to as multi-loop antennas, in electronic methods for monitoring rotationally symmetric metallic workpieces is known.

For example, US 2009/0295659 A1 claims an RFID antenna arrangement, a magnetic field generating device, and a magnetic field focusing arrangement.

In this case, an RFID antenna arrangement configured to be excited with a carrier signal is claimed, wherein the RFID antenna arrangement comprises an inductive component with a loop antenna arrangement, wherein the circumference of the loop antenna arrangement is not more than 25% of the wavelength of the carrier signal and at least one capacitive component is coupled to the inductive component.

As also claimed, the device has a second slot arrangement adjacent to the first slot arrangement.

Furthermore, it claims a specially equipped RFID antenna arrangement, which comprises a multi-segment loop antenna arrangement, whereby the multi-segment loop antenna arrangement comprises the following: at least one first antenna segment having at least one first phase shift element configured to reduce the phase shift of the carrier signal within at least the one first antenna segment and wherein at least one second antenna segment comprises at least one second phase shift element configured to reduce the phase shift of the carrier signal within the at least one second antenna segment; at least one far field antenna array, wherein the length of each antenna segment is not more than 25% of the wavelength of the carrier signal, and at least one matching component configured to adjust the impedance of the multi-segment loop antenna arrangement.

WO 2009/049191 A2 (PCT/US2008/079555) claims a patch antenna and a method of manufacturing said patch antenna.

This patch antenna has a plurality of radiator layers (10), whereby each radiator layer comprises: a first planar dielectric substrate (14); a radiating element (12) on a first side of the dielectric support material (14); a recess (16) in the dielectric support material (14) around a circumference of the radiating element (12) and forms a continuous inner circumferential side wall (18) and a continuous outer circumferential side wall (20); several strips (28) located between the inner circumferential side wall (18) and the outer circumferential side wall (20), wherein the plurality of strips (28) function to hold an inner substrate part (24) in a fixed physical relationship to an outer substrate part (26) of the dielectric support material (14); a conductive coating arranged on the inner circumferential side wall (18) and/or the outer circumferential side wall (20); and a second sheet-like dielectric support material (36) with a third side and an opposite fourth side, wherein the second dielectric support material (36) includes a microstrip feed conductor (32) located on the third side; and a ground plane (38) arranged on the fourth side, wherein the ground plane (38) has a hole (40) between the radiator element (12) and the microstrip feed conductor (32).

CN 203883119 claims a multi-layer microstrip antenna with an isolating ring having the features that it comprises a grounding plate (4) and a plurality of layers of microstrip antennas arranged on a base plate (4), wherein each of the microstrip antennas is arranged in order of radiation, and a dielectric support material provided with a coaxial feed for feeding the cooler under the cooler and the coaxial feed hole goes through the dielectric support material through the base plate (4), arranged on the dielectric substrate of the microstrip antenna in the lower layer of each adjacent two-layered microstrip antenna. The feed surface formed by the coaxial feed conductor of the upper microstrip antenna is distributed on the metallized through-holes.

In a further embodiment, this solution, which deviates from the two-layered microstrip antenna described in the first claim, claims a multilayer structure of the multilayer microstrip antenna.

SUMMARY OF THE INVENTION

The objective of the invention is therefore to propose a solution with which electronic control of the selection of milling tools can be realized.

According to the invention, this objective is achieved through the use of a multi-layered loop antenna, hereinafter referred to as a multi-loop antenna, comprising at least two electrically conductive layers, which are separated by an insulating layer.

In addition, the antenna used has one or more insulating layers above and below the antenna structure, and thus on the potential contact surfaces.

Hereinafter, the solution according to the invention will explained in more detail based on an example of an electrode cap milling machine and the sole drawing figure.

BRIEF DESCRIPTION OF THE DRAWING

FIG. 1 shows the arrangement of the multi-loop antenna 1 according to the invention in a device for metalworking, especially for the machining of rotationally symmetric metallic workpieces, using an electrode cap milling machine as an example.

DETAILED DESCRIPTION OF THE INVENTION

A multi-loop antenna 1 is arranged on a tool carrier 2 near a rotationally symmetric tool 3, an electrode cap milling tool in the example, so that the multi-antenna 1 encloses the rotationally symmetric tool 3.

In this case the multi-loop antenna 1 is connected to the process monitoring and control technology via an antenna connection 5.

Figure 1:
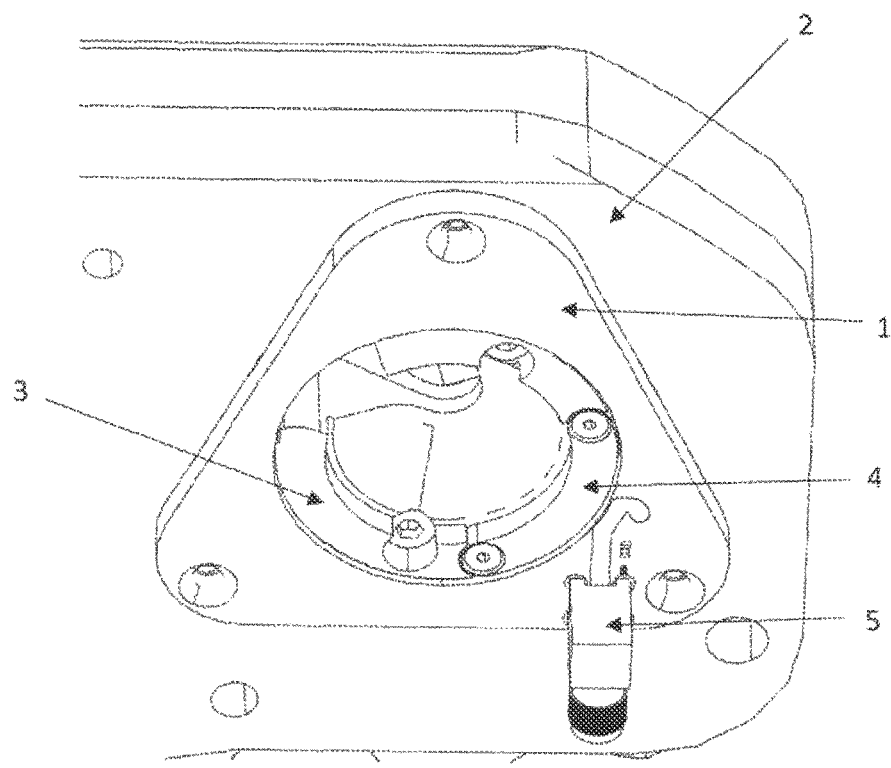
FIG. 1 is a perspective view of a multiloop antenna according to the invention.
Figure 2:
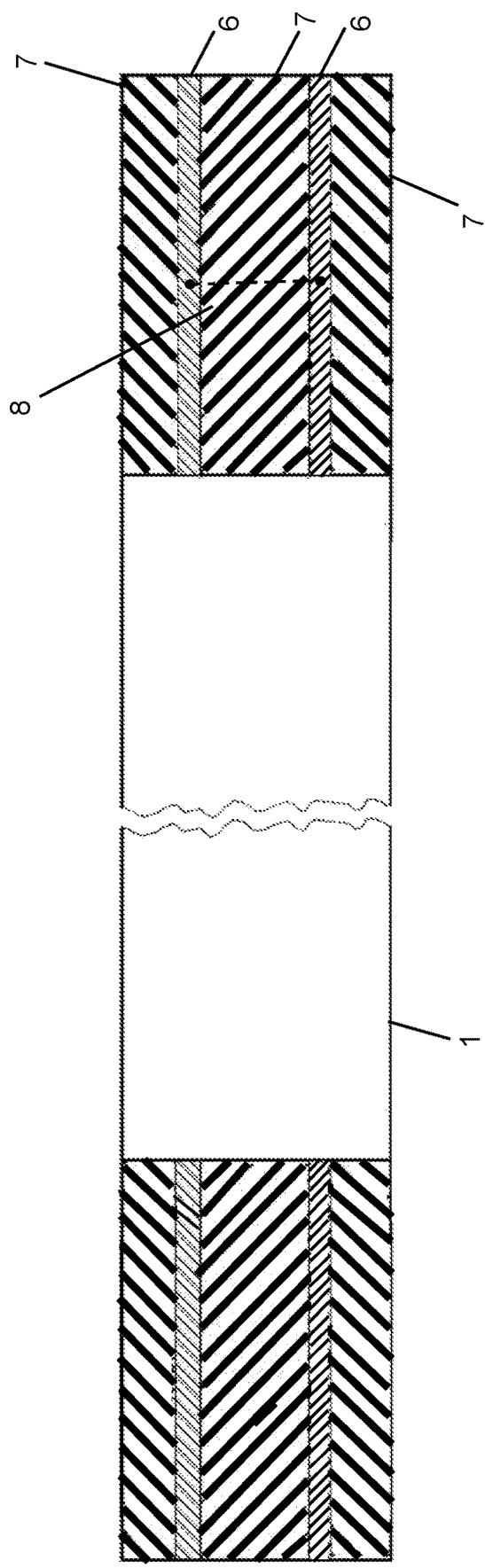
FIG. 2 is a diagrammatic section view of the antenna structure.

As seen in FIG. 2, the multi-loop antenna 1 includes at least two electrically conductive layers 6 connected by a connection 8. The at least two electrically conductive layers 6 are separated by an insulating layer 7. In addition, the antenna used has one or more insulating layers 7 above and below the antenna structure, and thus on the potential contact surfaces.

An RFID transponder 4 is mounted on the rotationally symmetric tool 3.

RFID refers to a technology for transmitter-receiver systems, which is used for the automatic and contactless authentication and localization of objects and living beings using radio waves.

An RFID system comprises a transponder, which is located on or in the object or living being and which contains an identification code, and a reader for reading this identification code.

The position of the RFID transponder 4 is arranged on the rotationally symmetric tool 3 so that it is located within the electromagnetic ring field of the multi-loop antenna 1.

The multi-loop antenna 1 is arranged on the tool carrier 2 so that it is possible to query the RFID transponder 4 on the rotationally symmetric component in any position, when in motion, and when at rest.

To monitor the rotationally symmetric tool 3, it is possible to write to and read from RFID transponder 4 with this multi-loop antenna 1.

This not only makes it possible to detect the presence of the rotationally symmetric tool 3, but also to read and write specific information on the RFID transponder 4 of the rotationally symmetric tool 3, and thus to monitor it.

In particular, this is possible for process monitoring purposes, and it is advantageous that information such as the tool type, serial number of the tool, operating times, downtimes can be read, as well as, for example, to read the tool type of previously used tool, the serial number of the previously used tool, the operating times of the previously used tool, and the downtimes of the previously used tool.

This information to be monitored and retrieved enables direct process monitoring and control of the current tool as well as data that is advantageous for process monitoring for the statistical recording and evaluation of process-relevant data and information.

The invention claimed is:

1. In an electrode cap milling device, a multi-loop antenna for monitoring a milling tool, comprising:
   a tool carrier for carrying the milling tool;
   a plurality of stratifications of electrically conductive layers and insulating layers separating said electrically conducting layers, said plurality of stratifications disposed in said tool carrier; and
   said electrically conductive layers being connected to one another; and
   an RFID system for monitoring the milling tool, said RFID system including an RFID transponder configured for being carried on the milling tool.

2. The multi-loop antenna according to claim 1, wherein said multi-loop antenna is configured to describe and read out said RFID transponder carried on the milling tool, thus enabling electronic control and evaluation of a selection and targeted information of the milling tool.

3. The multi-loop antenna according to claim 2, wherein the targeted information is selected from the group consisting of a type of milling tool, a serial number of the milling tool, times of use of the milling tool, and idle times of the milling tool.

4. The multi-loop antenna according to claim 2, wherein said multi-loop antenna encloses said RFID transponder.

5. In an electrode cap milling device, a device for monitoring a milling tool, comprising:
   a multi-loop antenna arranged on a tool carrier in a vicinity of a rotationally symmetric milling tool, said multi-loop antenna enclosing the rotationally symmetric milling tool and being configured to generate an electromagnetic ring field;
   an RFID transponder carried on the rotationally symmetric milling tool and in a position within the electromagnetic ring field of said multi-loop antenna; and
   said multi-loop antenna being arranged on the tool carrier to enable said RFID transponder on the rotationally symmetric milling tool to be queried in any position while in motion and when at rest.

6. The multi-loop antenna according to claim 5, wherein said multi-loop antenna is configured to describe and read out said RFID transponder of the rotationally symmetric milling tool, thus enabling electronic control and evaluation of a selection and targeted information of the milling tool.

7. The multi-loop antenna according to claim 6, wherein the targeted information is selected from the group consisting of a type of milling tool, a serial number of the milling tool, times of use of the milling tool, and idle times of the milling tool.

8. An arrangement in electrode cap milling devices for monitoring milling tools when machining rotationally symmetric workpieces, the arrangement comprising:
- a multi-layered, ring-shaped multi-loop antenna; and
- an RFID system for monitoring rotationally symmetric milling tools when machining the rotationally symmetric workpieces, said RFID system including an RFID transponder carried on the rotationally symmetric milling tool and being configured to communicate with said multi-loop antenna;
- said multi-loop antenna being arranged on a tool carrier in a vicinity of the rotationally symmetric milling tool and to enclose the rotationally symmetric milling tool;
- said RFID transponder being disposed in a position on the rotationally symmetric milling tool within in an electromagnetic ring field of the multi-loop antenna; and
- said multi-loop antenna being arranged on the tool carrier to enable querying said RFID transponder on the rotationally symmetric milling tool in any position when in motion and when at rest.

* * * * *